United States Patent [19]

Fujiwara et al.

[11] Patent Number: 4,823,033
[45] Date of Patent: Apr. 18, 1989

[54] MINIATURE MOTOR HAVING COATED RUBBER PERMANENT MAGNET

[75] Inventors: Hitoshi Fujiwara; Shotaro Hayakawa; Takanobu Lee, all of Matsudo, Japan

[73] Assignee: Mabuchi Motor Co., Japan

[21] Appl. No.: 162,501

[22] Filed: Feb. 26, 1988

[30] Foreign Application Priority Data

Feb. 27, 1987 [JP] Japan .................. 62-44380

[51] Int. Cl.4 ............................ H02K 15/12
[52] U.S. Cl. ................. 310/45; 310/40 MM
[58] Field of Search ............ 310/40 MM, 43, 45

[56] References Cited

U.S. PATENT DOCUMENTS

| | | | |
|---|---|---|---|
| 3,173,044 | 3/1965 | Pittman Jr. ........................ | 310/43 |
| 3,818,586 | 6/1974 | Harkness et al. ................. | 310/45 X |
| 3,891,879 | 6/1975 | Tamada et al. ................... | 310/45 X |
| 3,938,914 | 2/1976 | Zimmermann .................... | 310/104 X |
| 4,173,822 | 11/1979 | Fütterer et al. ................... | 310/43 X |
| 4,482,829 | 11/1984 | Tardien et al. .................... | 310/105 |
| 4,587,450 | 5/1986 | Ozaki ................................ | 310/156 |
| 4,710,659 | 12/1987 | Takano et al. .................... | 310/43 X |

Primary Examiner—William M. Shoop, Jr.
Assistant Examiner—Marc S. Hoff
Attorney, Agent, or Firm—McGlew & Tuttle

[57] ABSTRACT

A miniature motor using a rubber magnet for the permanent magnet for creating a field, in which a coating film is formed on the rubber magnet.

The coating film is gas-impermeable, possibly of suitable synthetic resin, to prevent any harmful gas generated in the rubber magnet from escaping therefrom and damaging the contact surfaces of the motor.

6 Claims, 1 Drawing Sheet

MINIATURE MOTOR HAVING COATED RUBBER PERMANENT MAGNET

BACKGROUND OF THE INVENTION

This invention relates generally to a miniature motor, and more particularly to a miniature motor having a rubber magnet as the permanent magnet for producing a field, in which a gas-permeable coating film is formed on the surface of the rubber magnet to provide harmful gases that might contaminate the sliding surfaces of the commutator and the metallic brushes from evolving from the rubber magnet.

DESCRIPTION OF THE PRIOR ART

The permanent magnet for producing a field in a miniature motor has heretofore been manufactured to a desired dimensional accuracy by grinding a so-called sintered magnet that is formed by sintering. This process, however, involves various problems such as high manufacturing costs and the brittleness of the finished product.

In recent years, however, flexible rubber magnets having good machinability have become increasingly popular as a substitute for the conventional types of magnet, including sintered magnets. The rubber magnet is particularly suitable for the permanent magnet for producing a field in a miniature motor having a smaller diameter compared with the axial length thereof (in other words, of a slender shape). (Japanese Patent Application No. 150397 of 1986, Japanese Patent Application No. 150398 of 1986, Japanese Utility Model Application No. 97968 of 1986, and Japanese Utility model Application No. 97969 of 1986) The above-mentioned rubber magnet is manufactured by mixing strontium ferrite powder, for example, with approx. 10% of rubber, and additives of vulcanizer, vulcanizing accelerator and lubricant, and then magnetizing the mixture. The resulting rubber ferrite having good flexibility is free from cracking and easy to mold into any desired shape.

The aforementioned rubber magnet, however, evolves gases of the components of synthetic rubber, such as butadiene, and those of the aforementioned additives. The evolved gas has such a property as to react with Cu, Au, Ag, Ag-Pd, Ag-Cd, Au-Cu-Cd and other metals, forming a blackened product as an electrically insulating substance.

Consequently, when a rubber magnet is used for a permanent magnet for producing a field in a miniature motor, a blackened product is formed on the surfaces of the commutator and the metallic brushes, which are usually made of Cu, Au, --- or any other metal mentioned above, causing poor electrical contact between both. This makes current flow between the commutator and metallic brushes unstable, resulting in various adverse effects on motor performances, such as the superimposition onto the current waveform of the high-frequency components associated with spark generation, as shown in FIG. 4 (A), and deterioration in the stability of motor revolution with time, as shown in FIG. 4 (B).

Furthermore, the degree of evolution of the aforementioned gases varies with the manufacturing lots of rubber magnets, leading to uneven motor characteristics.

It is known that the volume of gases evolved from the rubber magnet gradually reduces in the course of aging, or by heating the rubber magnet.

In the miniature motor using the conventional type of rubber magnet, therefore, the abovementioned unwanted problems are overcome by using those rubber magnets as the field magnets after it has been confirmed that gas generation has been reduced to a predetermined value by heating them, or subjecting them to aging. This method, however, leads to increased man-hours and cannot eliminate gas evolution completely.

SUMMARY OF THE INVENTION

It is an object of this invention to overcome the aforementioned problems. To achieve this object, the miniature motor of this invention has such a construction that a rubber magnet is used as the permanent magnet for creating a field, and a coating film is formed on the surface of the rubber magnet.

These objects and other advantages of this invention will become apparent from the following detailed description considered together with the accompanying drawings.

DETAILED DESCRIPTION OF THE EMBODIMENTS

Figure 1:
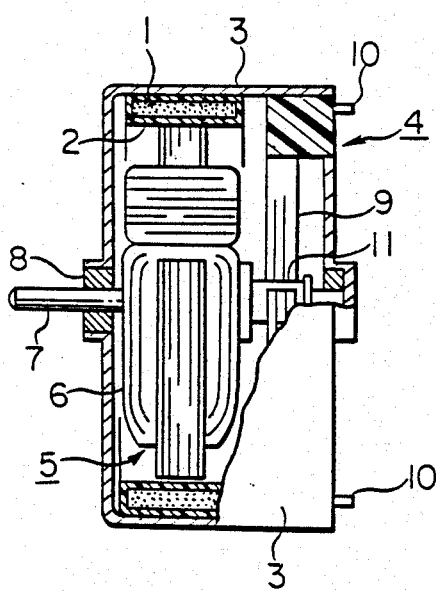
FIG. 1 is a partially cross-sectional diagram of assistance in explaining a miniature motor embodying this invention.
Figure 2:
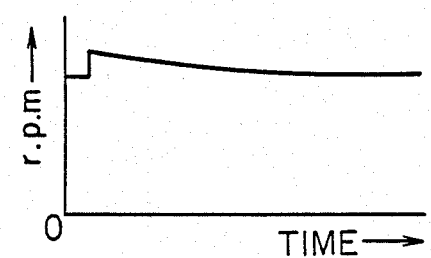
FIG. 2 is a characteristic diagram illustrating the relationship between the revolution of the miniature motor of this invention and time.
Figure 3:
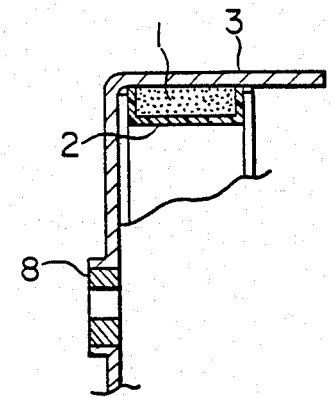
FIG. 3 is a cross-sectional view of the essential part of another embodiment of this invention.
Figure 4A:
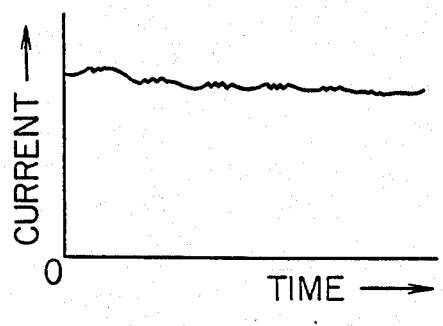
FIGS. 4 (A) and (B) are characteristic diagrams showing the relationship between the revolution of a miniature motor of a conventional type having a rubber magnet and time.
Figure 4B:
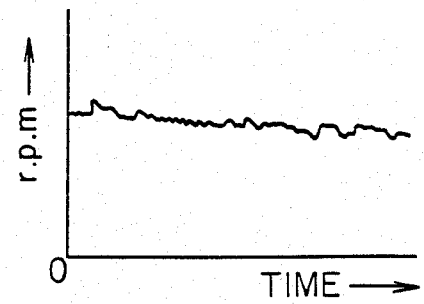

FIG. 1 is a partially cross-sectional diagram illustrating a miniature motor embodying this invention, and FIG. 3 is a cross-sectional view of the essential part of another embodiment of this invention. The relationship between the revolution of these miniature motors embodying this invention and time is shown in the characteristic diagram of FIG. 2.

First, description will be made, referring to the embodiment shown in partial cross-section in FIG. 1.

In FIG. 1, numeral 1 refers to a rubber magnet; 2 to a coating film covering the surface of the rubber magnet 1; 3 to a motor case; 4 to a small case; 5 to a rotor; 6 to a rotor winding; 7 to a motor shaft; 8 to a bearing; 9 to a brush; 10 to a brush terminal; and 11 to a commutator, respectively.

The embodiment shown in FIG. 1 is a miniature motor having essentially the same construction as known d-c miniature motors.

In the miniature motor shown, the rotor 5 is caused to rotate by causing electric current to flow in the rotor winding 6 via the brush terminal 10, the brush 9 and the commutator 11. The present invention differs from the known d-c miniature motor in that the surface of the rubber magnet 1 is covered with a gas-impermeable coating film 2. Consequently, even if metal-blackening gases are left in the rubber magnet 1, the gases can be prevented from being discharged to the outside of the magnet.

In the following, the material and forming method of the coating film 2 covering the surface of the rubber magnet 1 will be described.

The material of the coating film 2 should preferably have gas impermeability since the coating film 2 is intended to shield the metal-blackening gases remaining in the rubber magnet 1. To protect from chemical attack by the evolved gases, the material of the film 2 should preferably have resistance to chemicals, oils and heat. Taking these factors into consideration, the coating film 2 is made of any one of polyamide, acrylic, vinyl, urethane, polyvinyl alcohol, fluorine and other resins.

To form a coating film 2 with any one of these resins, a paint or coating solution of the polyamide, acrylic—or any other resin is sprayed or burshed on the surface of the rubber magnet 1; or the rubber magnet 1 is immersed in the bath of the paint or coating solution for a predetermined period of time.

As described above, the embodiment shown in FIG. 1 is a miniature motor having the rubber magnet 1 on the surface of which the coating film 2 is provided. The characteristics of the motor of this embodiment, in terms of the relationship between the revolution of the miniature motor and time, are quite stable independently of the lapse of time, as schematically shown in FIG. 2. Although the embodiment shown in FIG. 1 is concerned with a rubber magnet 1 on the entire surface of which a coating film 2 is formed, this invention is not limited to this arrangement. As shown in FIG. 3, a coating film 2 may be formed on the rubber magnet 1 which has been installed in advance at a location shown in FIG. 3 on the motor case 3 to substantially shield the gases evolved from the rubber magnet 1. In the embodiment shown in FIG. 3, a coating film 2 is formed by spraying a paint or coating solution of polyamide, acrylic—or any other resin, as mentioned above, over the exposed surface and an area ranging from the exposed surface to part of the motor case 3, using a predetermined spraying tool and jig.

In the embodiment shown in FIG. 3, as described above, the gases evolved from the rubber magnet 1 can be shielded by the coating film 2. Thus, the same effects can be achieved as those obtained with the embodiment shown in FIG. 1 above.

As described above, this invention makes it possible to prevent the motor electrical parts involving sliding contact from contaminating by the gases evolved from the rubber magnet since the evolution of the gases from the rubber magnet can be reduced by using as the permanent magnet for creating a magnetic field a rubber magnet on the surface of which a gas-impermeable coating film is formed.

With this invention, which makes it possible to prevent contamination of the miniature motor electrical parts involving sliding contact and thus to ensure stable current flow at the aforementioned electrical parts, a miniature motor having stable motor characteristics can be realized.

What is claimed is:

1. A miniature motor of the kind having a coated rubber permanent magnet, the motor having a motor case having rubber magnets on the inside surface and having an opening at one end thereof, a rotor having a commutator on a motor shaft, a small case fitted to said motor case opening, and brushes supported by said small case so as to make electrical contact with said commutator, characterized in that a coating film is formed on the surface of said rubber magnets, said coating film being gas-impermeable.

2. A miniature motor as claimed in claim 1 wherein said coating film is made of a material having resistance to chemicals, oils, and heat.

3. A miniature motor as claimed in claim 1 wherein said coating film is formed by a synthetic resin layer.

4. A miniature motor as claimed in claim 1 wherein said coating film is formed by applying a paint or coating solution to the surface of said rubber magnet.

5. A miniature motor as claimed in claim 1 wherein part of the surface of said rubber magnet is shielded by a casing or structure of said miniature motor.

6. A miniature electric motor comprising:
   a motor case;
   a motor shaft rotatably mounted on the case;
   a rotor having a commutator and carried by the shaft;
   brush means mounted on the case so as to make electrical contact with said commutator;
   at least one rubber permanent magnet mounted within the case on an inside surface thereof;
   a gas-impermeable film coating provided on the surface of said at least one rubber permanent magnet whereby harmful gases evolving in the rubber magnet are prevented from escaping therefrom into the casing.

* * * * *